(12) United States Patent
Hipp

(10) Patent No.: US 6,759,649 B2
(45) Date of Patent: Jul. 6, 2004

(54) OPTOELECTRONIC DETECTION DEVICE

(75) Inventor: Johann Hipp, Hamburg (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 10/232,991

(22) Filed: Aug. 30, 2002

(65) Prior Publication Data

US 2003/0066954 A1 Apr. 10, 2003

(30) Foreign Application Priority Data

Sep. 3, 2001 (DE) .......................... 101 43 060

(51) Int. Cl.[7] ............................... H01J 3/14
(52) U.S. Cl. ............ 250/234; 250/222.1; 356/607
(58) Field of Search ......................... 250/216, 221, 250/222.1, 234, 235, 236; 356/431, 607, 608; 359/212, 220, 221, 226

(56) References Cited

U.S. PATENT DOCUMENTS

| | | | | |
|---|---|---|---|---|
| 5,179,271 A | * | 1/1993 | Lindacher et al. | 235/462.22 |
| 5,455,669 A | * | 10/1995 | Wetteborn | 356/5.01 |
| 5,625,447 A | * | 4/1997 | Kikuchi et al. | 356/4.01 |
| 5,710,417 A | | 1/1998 | Joseph et al. | |

FOREIGN PATENT DOCUMENTS

| | | | |
|---|---|---|---|
| DE | 930909 | | 7/1949 |
| DE | 4402642 A1 | | 8/1995 |
| DE | 4412044 A1 | | 10/1995 |
| DE | 19530281 A1 | | 2/1997 |
| DE | 197 57 848 A1 | * | 7/1999 |
| DE | 197578448 A1 | | 7/1999 |
| EP | 0185816 A1 | | 12/1984 |
| EP | 0653720 A2 | | 11/1994 |
| EP | 0997746 A1 | | 5/2000 |
| EP | 1055937 A2 | | 5/2000 |
| EP | 1055937 A2 | * | 11/2000 ........... G01S/7/481 |

* cited by examiner

*Primary Examiner*—David Porta
*Assistant Examiner*—David C. Meyer
(74) *Attorney, Agent, or Firm*—Townsend and Townsend and Crew LLP

(57) ABSTRACT

The invention relates to an optoelectronic detection device, in particular a laser scanner, comprising at least one transmitter unit for the transmission of electromagnetic radiation, preferably pulsed electromagnetic radiation, at least one receiver unit associated with the transmitter unit and at least one radiation deflection device with which radiation transmitted by the transmitter unit can be guided into a monitored zone and radiation reflected from the monitored zone can be guided onto the receiver unit, with the front of the radiation propagating in the direction of the deflection device being of elongated shape and the deflection device being formed and being movable relative to the elongated radiation front such that the radiation front reflected into the monitored zone adopts different orientations in space in dependence on the position of the moved deflection device.

24 Claims, 4 Drawing Sheets

OPTOELECTRONIC DETECTION DEVICE

BACKGROUND OF THE INVENTION

The invention relates to an optoelectronic detection device comprising at least one transmitter unit for the transmission of electromagnetic radiation, preferably pulsed electromagnetic radiation, at least one receiver unit associated with the transmitter unit and at least one radiation deflection device with which radiation transmitted by the transmitter unit can be guided into a monitored zone and radiation reflected from the monitored zone can be guided onto the receiver unit.

Such detection devices are generally known and are attached to vehicles, for example, to detect the environment of the vehicle during the journey.

SUMMARY OF THE INVENTION

It is an object of the invention to provide an optoelectronic detection device of the kind first named which allows a reliable detection of the monitored zone and is designed as simply as possible and which, in particular, has as few moving components as possible.

This object is satisfied in that the front of the radiation propagating in the direction of the deflection device is of elongated shape and the deflection device is made and is movable relative to the elongated radiation front such that the radiation front reflected into the monitored zone adopts different orientations in space in dependence on the position of the moved deflection device.

In accordance with the invention, the scanning of the monitored zone not only takes place with the aid of punctiform radiation transmitted into the monitored zone, but the detection device is able to transmit an elongated radiation front into the monitored zone. The radiation deflection device serves this purpose and deflects the elongated radiation front subsequent to its generation such that the radiation front is transmitted into the monitored zone in an orientation dependent on the position of the deflection device. The scanning of the monitored zone therefore takes place by means of a two-dimensional radiation front which—together with the movement of the deflection device—results in a three-dimensional or quasi three-dimensional scanning of the monitored zone. When a correspondingly designed receiver unit is used, individual sections of the reflected elongated radiation front can be evaluated separately; i.e. a section of the respectively scanned object can be recorded for every direction in which the light line or streak is transmitted. Furthermore, different orientations of the radiation front transmitted into the monitored zone can be realized by means of the movable deflection device, whereby the optoelectronic detection device in accordance with the invention can be directly adapted to the respective application.

It is of special advantage for the invention that the deflection device is the only component which has to be moved in order to scan the monitored zone by means of the radiation front. The transmitter unit and the receiver unit, as well as the supply and connection devices associated therewith, do not have to be moved. The design of the detection device in accordance with the invention is hereby substantially simplified. Since the deflection device is moved relative to the propagating radiation front, the orientation of the radiation front does not change with respect to the alignment of the receiver unit; i.e. the orientation of the radiation front is the same before its deflection into the monitored zone, on the one hand, and after reflection in the monitored zone and a repeated deflection back in the direction of the receiver unit, on the other hand. For this reason, it is not necessary to take the different orientations of the radiation front in the monitored zone into account in the design of the receiver unit, which keeps the design of the receiver unit simple.

It is furthermore of advantage in accordance with the invention that no optical components are required for the production of the elongated radiation front which have to move together with the deflection device. The design of the detection device in accordance with the invention is hereby further simplified. In accordance with the invention, an especially low construction height, and thus an advantageous compact design overall, can be realized in particular, since no components which have to be moved together with the deflection device are required between the transmitter unit and/or the receiver unit, on the one hand, and the deflection device, on the other hand, to generate the radiation front.

The transmitter unit is preferably formed to transmit the elongated radiation front. Here, it is the transmitter unit itself which generates the elongated radiation front so that no optical components are needed between the transmitter unit and the radiation deflection device.

In a particularly preferred embodiment of the invention, the radiation front is a continuous radiation line. Consequently, a light line or streak is transmitted into the monitored zone with which objects located in the monitored zone are scanned not line by line, but areally so that a three-dimensional scanning takes place overall.

Alternatively, the elongated radiation front can also be formed by discrete radiation spots or beads arranged along a line in that, for example, a plurality of "light fingers" or individual rays are simultaneously directed onto the deflection device, for example by a correspondingly designed transmitter unit. A three-dimensional detection of the monitored zone is also possible in this way.

It is further preferred for the radiation to propagate in an expanding manner in the direction of the deflection device. The origin of the expansion is preferably not moved relative to the transmitter unit and the receiver unit during operation. The origin of the expansion is in particular formed by the transmitter unit.

The radiation propagating from the transmitter unit to the deflection device is preferably uninfluenced by optical components serving for the radiation refraction or diffraction of the radiation. A particularly advantageous compact design of the detection device can hereby be realized.

This compact design, resulting in particular through reduction of the construction height, is a substantial step in the direction of a miniaturization of optoelectronic detection devices, which is in particular of importance for the use on or in vehicles, where there is as a rule little room available for such detection devices. The wind resistance is moreover hereby minimized.

In a particularly preferred practical embodiment of the invention, the deflection device is rotatable and in particular adapted to carry out a continuous rotational movement at a constant speed. A scanning or scanner function is hereby realized with which it is possible to realize scanning over an angular range of up to 360° and thus a monitoring of the total environment of the detection device.

The radiation deflection device preferably has at least one planar reflection surface for radiation transmitted by the transmitter unit and reflected from the monitored zone. This reflection surface is preferably a planar mirror. The deflection device is in particular made as a mirror device and/or as a prism device.

It is further proposed that a reflection surface of the deflection device extends in an inclined manner with respect to a transmission plane and/or a reception plane and the deflection device is rotatable about an axis extending approximately perpendicular to the transmission plane and/or the reception plane.

In this way a situation is achieved in which, in a rotated position of the deflection device, the radiation front reflected by the reflection surface into the monitored zone is perpendicular with respect to the transmission plane and/or the reception plane; i.e. a light line is transmitted more or less upright. By further rotation of the deflection device by 90°, the radiation front transmitted into the monitored zone lies in a plane extending parallel to the transmission plane and/or the reception plane; i.e. the operation is carried out with a more or less horizontally lying light line. In intermediate rotational positions of the deflection device, the radiation front then extends in a more or less inclined manner to the transmission plane and/or the reception plane. With a rotating deflection device, work is consequently carried out with a rotating image or with a rotating light line or streak.

In accordance with a further preferred embodiment of the invention, provision is made for the transmitter unit to include at least one laser diode as a radiation source which is made for the transmission of a linear or streak-shaped radiation front.

Provision is furthermore preferably made for an optical transmission system to be installed in front of a radiation source of the transmitter unit. The radiation source, in particular a laser diode, and the optical transmission system can be combined to form a compact unit. In this way, additional optical components are not required between the transmitter unit and the deflection device for the generation of the elongated radiation front, whereby an advantageous compact construction of the detection device in accordance with the invention is achieved overall.

It is furthermore proposed in accordance with the invention for the receiver unit to have at least one areal radiation receiver. The radiation receiver is preferably matched to the elongated shape of the radiation front and in particular has an approximately strip-like basic shape.

The receiver unit, in particular an areal radiation receiver of the receiver unit, preferably includes a plurality of photodiodes which are in particular arranged in a single-line or multi-line manner.

Provision is preferably further made for the transmitter unit and the receiver unit to form an at least approximately common transmission/reception plane. This transmission/reception plane is in particular formed by an optical transmission system disposed in front of the radiation source as well as by an optical reception system of the receiver unit disposed in front of an areal radiation receiver.

The invention moreover relates to the use of at least one optoelectronic detection device such as was described above in connection with a vehicle. In this connection, the optoelectronic device is in particular used for object recognition and tracking.

In this connection, an optoelectronic detection device is preferably used which is made and is attached to or in the vehicle such that, in normal driving operation, the radiation front comprising an elongated shape extends at least substantially in the vertical direction on propagation toward the front in the direction of travel.

This use has the advantage that height information, for example on vehicles traveling in front of the vehicle equipped with the detection device, can be obtained from the region disposed in front of the vehicle in the direction of travel.

Further preferred embodiments of the invention relating both to the optoelectronic detection device itself and to the use in accordance with the invention are also set forth in the description and the drawing.

The invention will be described in the following by way of example with reference to the drawing.

DESCRIPTION OF THE PREFERRED EMBODIMENTS

Figure 1B:
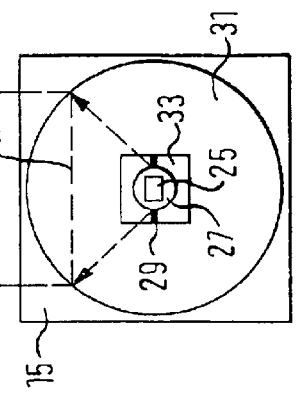
FIG. 1b shows the detection device of FIG. 1a in plan view.

The detection device in accordance with the invention includes a transmitter unit 11 which has a laser diode 25 serving as a radiation source and an optical transmission system 27 in the form of a lens or a lens arrangement disposed in front of the laser diode 25. Furthermore, a receiver unit 13 is provided which has an areal radiation receiver 29 which is formed, for example, by photodiodes arranged in a line and in front of which an optical reception device 31, formed for example by a lens, is disposed.

A prism 15, which serves as a radiation deflection device and has a planar reflection surface 19 facing the transmission/reception plane, is rotatable continuously at a constant speed about an axis 23 extending perpendicular to the transmission/reception plane. For this purpose, the prism 15 is connected to a drive unit 33.

For certain vehicle applications, a scanning frequency of 10 Hz, i.e. of 10 scans per second covering 360° in each case, and an angular resolution of at least 1° are required. Here, the laser diode 25 must produce radiation pulses with a frequency of 3600 Hz for an angular resolution of 1°. The laser diode 25 of the scanner in accordance with the invention works with a pulse frequency of 14,400 Hz, whereby an angular resolution of 0.25° is achieved.

Figure 1A:
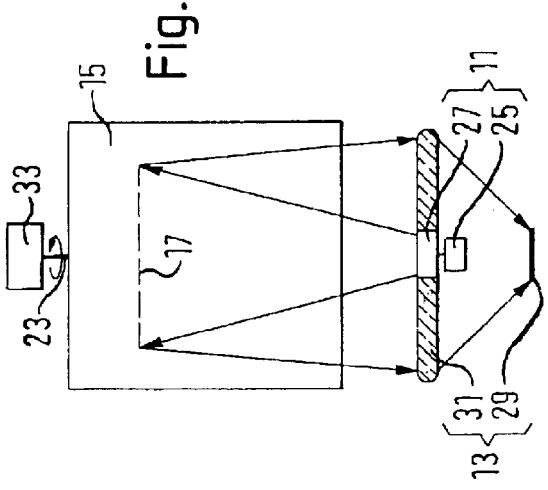
FIG. 1a shows an embodiment of an optoelectronic detection device in accordance with the invention in a side view with a deflection device disposed in a rotational position.

The optical transmission system 27 provides a fan-like widening or expansion of the radiation produced by the laser diode 25 such that the front 17 of the radiation propagating in the direction of the reflection surface 19 is of line shape and consequently, in the rotational position of the deflection device 15 in accordance with FIGS. 1a and 1b, a radiation line 17' is transmitted into the monitored zone which stands perpendicular to the transmission/radiation plane.

The orientation of the radiation front 17' reflected into the monitored zone changes on rotation of the prism 15 relative to the transmitter unit 11 and to the receiver unit 13, and thus relative to the elongated radiation front 17 propagating in the direction of the reflection surface 19; i.e. the light line 17' rotates with the prism 15.

Figure 2B:
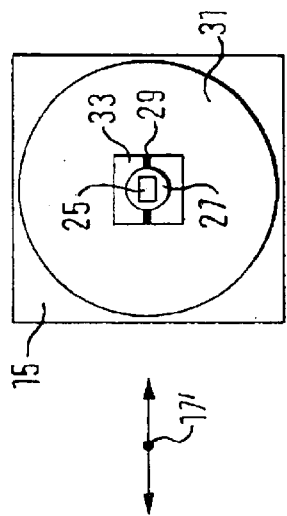
FIG. 2b shows the detection device of FIG. 2a in a plan view.
Figure 2A:
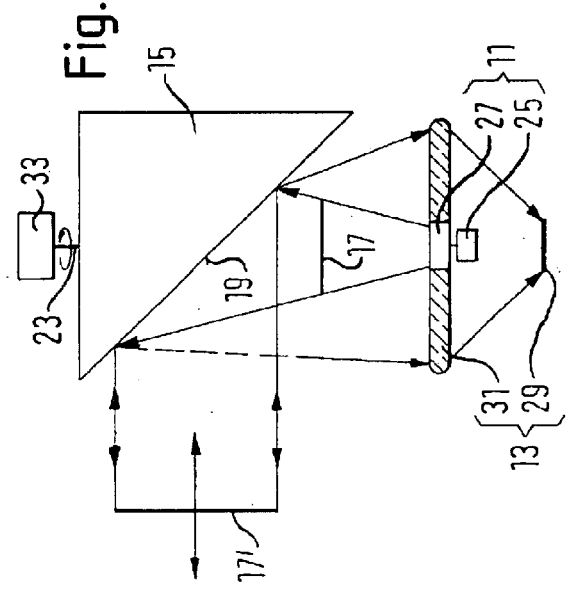
FIG. 2a shows the detection device of FIG. 1a with a deflection device disposed in another rotational position.

FIGS. 2a and 2b show the other extreme case with the deflection device 15 rotated by 90° with respect to the position of FIGS. 1a and 1b. The radiation front 17 still having the same orientation between the transmitter unit 11 and the reflection surface 19 is transmitted, as a result of the changed orientation of the reflection surface 19 extending in an inclined manner to the transmission/reception plane, as a radiation line 17' into the monitored zone which lies in a plane extending parallel to the transmission/reception plane.

The light line 17' transmitted into the monitored zone has a more or less strongly inclined position in the intermediate rotational positions (not shown) of the prism 15.

The detection device in accordance with the invention is preferably used in connection with a vehicle for object recognition and object tracking. In this connection, the detection device is preferably attached in or on the vehicle such that the transmission/reception plane extends horizontally, i.e. perpendicular to the vertical axis of the vehicle, in normal driving operation, i.e. with a horizontally oriented vehicle, and the upright light line or streak 17' in accordance with FIGS. 1a and 1b is transmitted to the front in the direction of travel of the vehicle. The division of the radiation receiver 29 of the receiver unit 13 into a plurality of individual receivers allows a separate evaluation of different regions of the light line or streak reflected onto the receiver 29 and thus the detection of contour profiles of the respectively scanned objects.

With this application, the regions disposed to the side of the vehicle are scanned with a horizontally extending radiation front, i.e. with a lying light line, such that—in contrast to the scanning to the front in the direction of travel—no height information is gained. However, since information from regions disposed in front of the vehicle in the direction of travel is of very high relevance in most vehicle applications, this circumstance can be accepted without problem in practice, especially since a light line which is lying and extends parallel to a plane extending perpendicular to the axis of rotation 23 of the deflection device 15 provides the advantage of a multiple scan at least for specific vehicle applications. The light line, which is lying or is disposed in the scanning plane, moreover advantageously allows a reduction in the scanning frequency, since a plurality of measuring points disposed next to one another are measured with it at the same time. The scanning frequency can thus be reduced by a factor corresponding to the number of measuring points.

Figure 3:
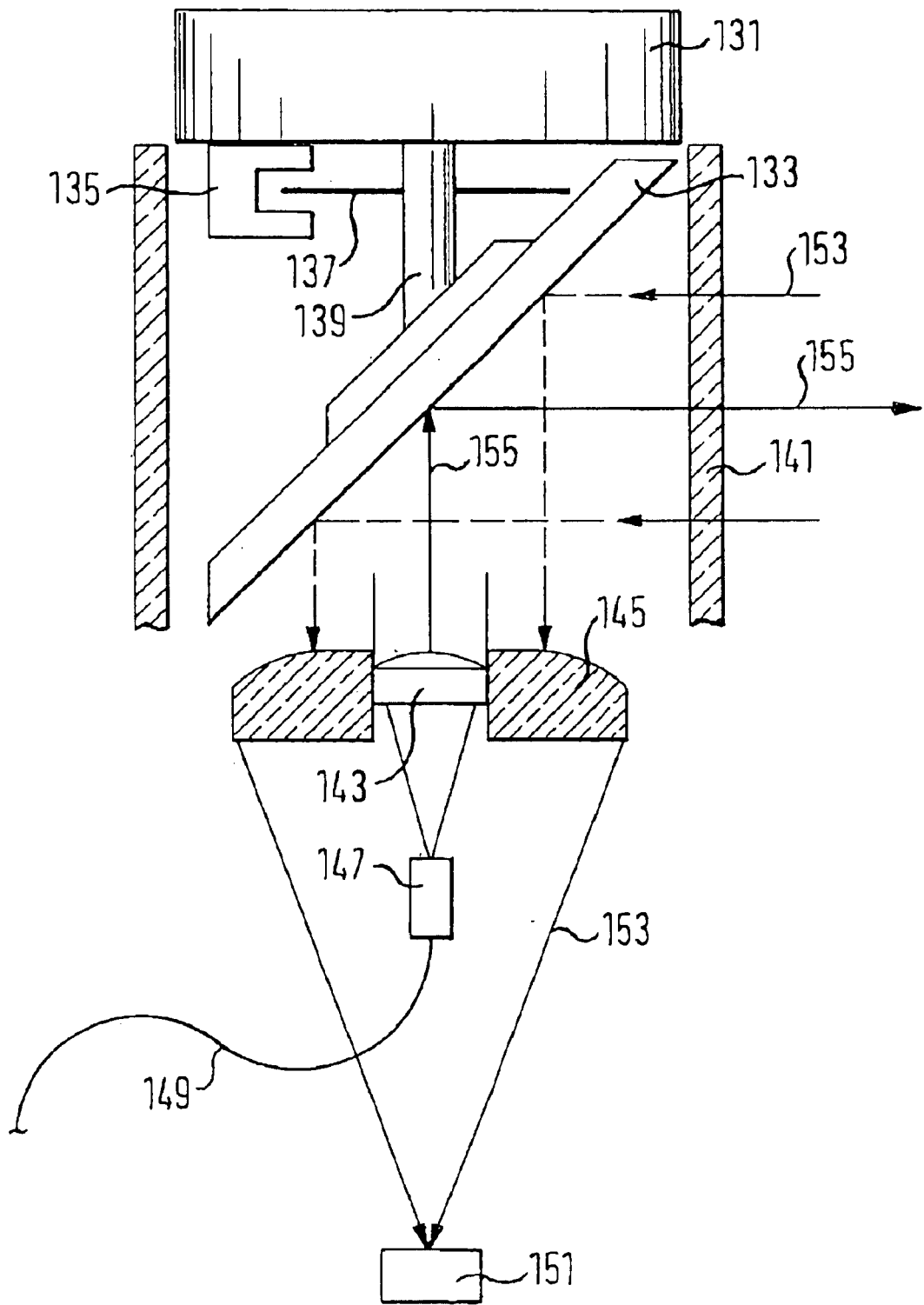
FIG. 3 is a side view of an optoelectronic detection device in accordance with the invention comprising an optical system and a mirror sub-assembly.

The optoelectronic detection device shown in FIG. 3 is likewise a laser scanner. It comprises a laser module 147, which includes a laser chip, and has a connection 149, the laser module serving as a linear radiation source, a projection lens 143 serving as a transmitting lens, a mirror 133 rotatable about an axis 139 by means of a motor 131 and a receiver unit which includes a receiver lens 145 surrounding the projection lens 143 and a receiver member having an areal radiation receiver in the form of a diode array which has a one-row arrangement of a plurality of photodiodes.

The mirror sub-assembly is arranged in a glass tube 141. The angular position of the mirror 133 is determined by means of an encoder disk 137 and an angular measuring device 135.

The radiation 155 transmitted by the transmitter unit, exiting the glass tube 141 after reflection at the mirror 133 and entering into the monitored zone, is again guided—after reflection in the monitored zone as incident radiation 153—via the mirror 133 onto the receiver lens 145 and from this onto the diode array of the receiver member 151.

Figure 4:
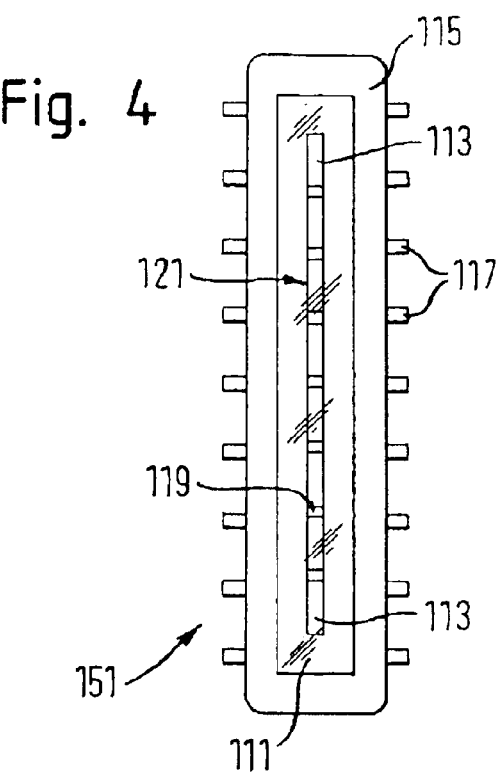
FIG. 4 is a plan view of a receiver array of the detection device of FIG. 3.

FIG. 4 shows the diode array 121 of the receiver member 151 which consists in this example of eight avalanche photodiodes 113 arranged in a row and serving as an areal radiation receiver. The individual diode elements 113 are separated from one another by webs 119 at which the receiver 121 is "blind".

The diode array 121 protected by a glass window 111 is arranged in a housing 115 provided with connector pins 117. A separate amplifier (not shown) is connected to each individual diode 113 so that a separate distance measurement can be carried out for each field of view corresponding to one of the individual diodes 113. The amplifiers are connected to a common evaluation unit (not shown).

Figure 5:
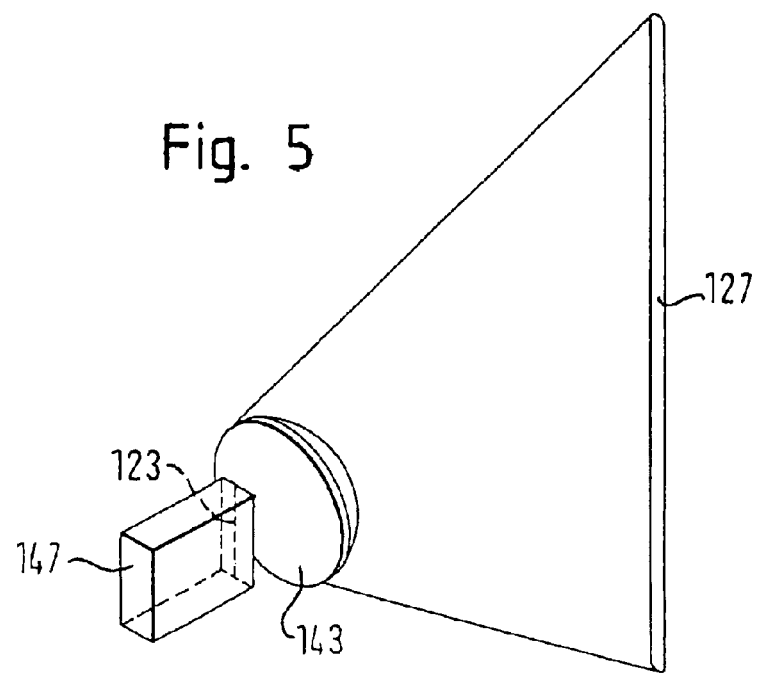
FIG. 5 illustrates the functional principle of the radiation source of the detection device of FIG. 3.

FIG. 5 schematically shows the laser chip 147 of the transmitter unit which has a p-n junction 123 serving as a linear radiation source. A projection lens 143 is disposed in front of the laser chip 147. The transmitter unit of laser module 147 and transmitter lens 143 generates a radiation line or light streak 127 as a projected image of the linear radiation source 123.

The expanded radiation propagating as a radiation line, i.e. the elongated radiation front transmitted by the transmission unit 143, 147, strikes the inclined mirror 133, which rotates with respect to the stationary transmitter/receiver unit, and is reflected out of the tube 141 into the monitored zone in an orientation dependent on the rotational position of the mirror 133.

Figure 6:
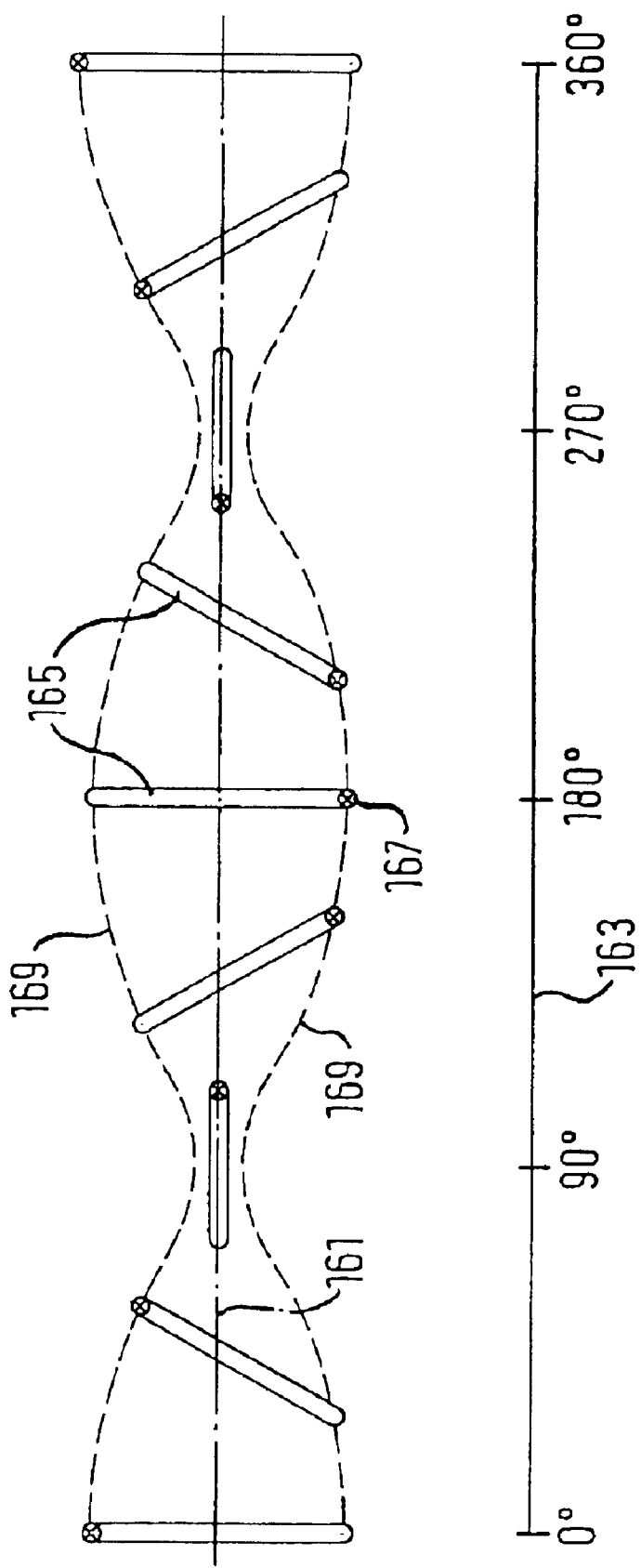
FIG. 6 is a representation to explain the scanned image of a detection device in accordance with the invention.

FIG. 6 shows the projected scanned image of the detection device in accordance with the invention for a complete revolution of the rotating mirror 133 including a horizontal angle of 360°. The image 165 of the line-like laser source 123 is rotated once about itself with respect to the horizon 161 in a mirror rotation due to the rotating mirror 133, whereby a sinusoidal expansion with an envelope 169 is created, with the sinusoidal curve defining the effective height of the light line.

With a laser scanner installed on a vehicle, this is aligned such that the antinodes of the sinusoidal expansion are directed to the front in the direction of travel and in the backward direction such that, in these directions, an expansion of the radiation takes place in the vertical direction which is advantageous for at least most vehicle applications; i.e. the vehicle environment is scanned to the front and rear with a large vertical angle.

In FIG. 6, the position of a region 167 of the projected line image 165 corresponding to one of the eight diode elements 113 is shown for different orientations of the line image 165 to illustrate the movement of this part of the overall line-shaped visual field during the scanning operation.

The continuously changing orientation of the line-shaped image 165 of the linear radiation source 123 in the monitored zone is taken into account in the evaluation of the received radiation 153 by means of the evaluation unit connected to the receiver member 151, with said image 165 always being imaged on the diode array 121 which is stationary and thus always having the same orientation in the scanner.

What is claimed is:

1. An optoelectronic detection device comprising at least one transmitter unit for the transmission of electromagnetic radiation, at least one receiver unit associated with the transmitter unit and at least one radiation deflection device with which radiation transmitted by the transmitter unit can be guided into a monitored zone and radiation reflected from the monitored zone can be guided onto the receiver unit, a front of the radiation propagating in the direction of the deflection device having an elongated shape and the deflection device being formed and being movable relative to the elongated radiation front such that the radiation front reflected into the monitored zone adopts different orientations in space in dependence on the position of the deflection device.

2. A device in accordance with claim 1, wherein the transmitter unit is made for the transmission of the elongated radiation front.

3. A device in accordance with claim 1, wherein the radiation front is a continuous radiation line or streak.

4. A device in accordance with claim 1, wherein the radiation front is formed by discrete radiation beads arranged along a line.

5. A device in accordance with claim 1, wherein the deflection device is movable relative to the transmitter unit and the receiver unit.

6. A device in accordance with claim 1, wherein the radiation propagates in an expanded manner in the direction of the deflection device, with the origin of the expansion being unmoved relative to the transmitter unit and the receiver unit during operation and being formed by the transmitter unit.

7. A device in accordance with claim 1, wherein the radiation propagating from the transmitter unit to the deflection device is not influenced by optical components serving for the radiation refraction or for the radiation diffraction.

8. A device in accordance with claim 1, wherein the deflection device is rotatable and adapted to carry out a continuous rotational movement at a constant speed.

9. A device in accordance with claim 1, wherein the deflection device has at least one planar reflection surface for radiation transmitted by the transmitter unit and reflected from the monitored zone and comprises at least one of a mirror device and a prism device.

10. A device in accordance with claim 1, wherein a reflection surface of the deflection device extends in an inclined manner to at least one of a transmission plane and a reception plane and the deflection device is rotatable about an axis extending approximately perpendicular to at least one of the transmission plane and reception plane.

11. A device in accordance with claim 1, wherein the transmitter unit includes, as a radiation source, at least one laser diode which is made for the transmission of a linear or streak-shaped radiation front.

12. A device in accordance with claim 1, wherein an optical transmission system is disposed in front of a radiation source of the transmitter unit.

13. A device in accordance with claim 12, wherein the optical transmission system disposed in front of the radiation source is arranged stationary relative to the radiation source.

14. A device in accordance with claim 1, wherein the receiver unit has at least one areal radiation receiver which has an optical reception system disposed in front of it.

15. A device in accordance with claim 14, wherein the radiation receiver is matched to the elongated shape of the radiation front and has an approximately strip-like basic shape.

16. A device in accordance with claim 1, wherein the receiver unit comprises an areal radiation receiver including a plurality of photodiodes which are arranged in one line or in a plurality of lines.

17. A device in accordance with claim 1, including radiation transmitting optics arranged optically downstream of the at least one transmitter unit and radiation receiving optics arranged optically upstream of the at least one receiver unit, the transmitting optics and the receiving optics being arranged at least approximately in a common plane.

18. Use of at least one optoelectronic detection device in accordance with at least claim 1 in connection with a vehicle for object recognition and object tracking.

19. Use in accordance with claim 18, wherein an optoelectronic detection device is used which is made and is attached to or in the vehicle such that, in normal traveling operation, the radiation front having an elongated shape extends substantially in a vertical direction on forward propagation in the direction of travel.

20. Use in accordance with claim 18, wherein the optoelectronic detection device is attached to or in the vehicle such that a plane defined by an areal radiation receiver of the receiver unit extends at least substantially horizontally in normal traveling operation.

21. An optoelectronic detection device comprising at least one transmitter unit for the transmission of an elongated electromagnetic radiation front, at least one receiver unit associated with the transmitter unit and at least one radiation deflection device with which the radiation front transmitted by the transmitter unit can be guided into a monitored zone and radiation reflected from the monitored zone can be guided onto the receiver unit, the deflection device being formed and being movable relative to the elongated radiation front such that the radiation front reflected into the monitored zone adopts different orientations in space in dependence on the position of the deflection device.

22. An optoelectronic detection device comprising a radiation deflector, a radiation receiver, a laser and a radiation transmitter generating an elongated radiation front propagating in a direction transverse to the radiation front towards the deflector so that the deflector directs the radiation front into a monitored zone, the deflector guiding radiation reflected from the monitored zone to the receiver, the deflector being formed and movable relative to the elongated radiation front so that the radiation front reflected into the monitored zone adapts different orientations in space in dependence on the position of the deflection device.

23. An optoelectronic device according to claim 22 wherein the laser generates a laser beam having the elongated radiation front.

24. An optoelectronic device according to claim 22 wherein the laser generates a radiation beam and the radiation transmitter converts the radiation beam transversely to its direction to thereby form the elongated radiation front.

* * * * *